(12) United States Patent
Chen

(10) Patent No.: US 9,062,819 B1
(45) Date of Patent: Jun. 23, 2015

(54) COLLAPSIBLE COMPUTER LAPTOP TABLE

(71) Applicant: Rong Chen, Corona Del Mar, CA (US)

(72) Inventor: Rong Chen, Corona Del Mar, CA (US)

( * ) Notice: Subject to any disclaimer, the term of this patent is extended or adjusted under 35 U.S.C. 154(b) by 0 days.

(21) Appl. No.: 14/562,152

(22) Filed: Dec. 5, 2014

(51) Int. Cl.
    *A47B 23/00*     (2006.01)
    *F16M 13/04*     (2006.01)
    *A47B 3/08*     (2006.01)
    *A47B 21/00*     (2006.01)
    *F16M 11/22*     (2006.01)

(52) U.S. Cl.
CPC .................. *F16M 13/04* (2013.01); *A47B 3/08* (2013.01); *A47B 21/00* (2013.01); *F16M 11/22* (2013.01); *A47B 23/00* (2013.01)

(58) Field of Classification Search
CPC .. A47B 2097/005; A47B 97/08; A47B 83/02; A47B 2003/145; A47B 21/00; A47B 23/002; A47B 23/0608; A47B 23/00; A47B 3/08; F16M 13/04; F16M 11/22
USPC ......... 108/42, 43, 93, 99, 166, 167, 179, 176, 108/77, 115; 248/460, 462, 166; 211/195, 211/149, 85; 297/156
See application file for complete search history.

(56) References Cited

U.S. PATENT DOCUMENTS

| | | | | |
|---|---|---|---|---|
| 599,962 | A * | 3/1898 | Hampshire | 108/179 |
| 1,180,057 | A * | 4/1916 | McNamara | 248/456 |
| 2,384,234 | A * | 9/1945 | Breese | 297/2 |
| 2,708,524 | A * | 5/1955 | Kerr | 108/25 |
| 2,941,582 | A * | 6/1960 | Tomat | 108/115 |
| 3,180,609 | A * | 4/1965 | Johnson | 248/460 |
| 3,778,077 | A * | 12/1973 | Johnson | 280/28.14 |
| 4,494,754 | A * | 1/1985 | Wagner, Jr. | 273/148 B |
| D281,657 | S * | 12/1985 | Roczey | D14/454 |
| 4,642,946 | A * | 2/1987 | Koch | 52/38 |
| 4,819,568 | A * | 4/1989 | Coffrin | 108/43 |
| 5,207,791 | A * | 5/1993 | Scherbarth | 273/148 B |
| 5,383,411 | A | 1/1995 | Tomaka et al. | |
| 6,033,014 | A * | 3/2000 | Nightengale | 297/174 R |
| 6,234,441 | B1 | 5/2001 | Gordon | |
| 6,349,729 | B1 * | 2/2002 | Meyer et al. | 132/73.5 |
| 7,252,040 | B2 | 8/2007 | Dumond | |
| 8,746,156 | B2 * | 6/2014 | Camarillo | 108/150 |
| 2002/0078862 | A1 * | 6/2002 | Bieza | 108/43 |
| 2002/0096091 | A1 * | 7/2002 | Cloud | 108/43 |
| 2004/0004048 | A1 * | 1/2004 | Britigan | 211/85.23 |

\* cited by examiner

*Primary Examiner* — Janet M Wilkens
(74) *Attorney, Agent, or Firm* — Crossley Patent Law

(57) ABSTRACT

A collapsible computer laptop table having a folding table with a rectangular upper platform with an upper socket, a vertical section having a ball disposed on each end, one ball rotatably disposed within the upper socket, a first lower platform having a squared end spaced apart from a thin edge, a lower socket in receipt of the second ball, a second lower platform having a squared end spaced apart from a thin edge, a pair of 90 degree hinges, one of each 90 degree hinge connecting the first end to the upper platform, one of each 90 degree hinge connecting the second end to the first lower platform, the folding table selectively collapsed to a first position, the table expanded into a second position, and wherein a user selectively sits atop the first lower platform and the second lower platform with the folding table in the second position.

2 Claims, 5 Drawing Sheets

COLLAPSIBLE COMPUTER LAPTOP TABLE

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of collapsible tables are known in the prior art. However, what is needed is a collapsible computer laptop table that is held in place by a user's legs.

FIELD OF THE INVENTION

The present invention relates to collapsible tables, and more particularly, to a collapsible computer laptop table that is selectively secured in use position by a user's legs.

SUMMARY OF THE INVENTION

The general purpose of the present collapsible computer laptop table, described subsequently in greater detail, is to provide a collapsible computer laptop table that has many novel features that result in a collapsible computer laptop table which is not anticipated, rendered obvious, suggested, or even implied by prior art, either alone or in combination thereof.

To accomplish this the collapsible computer laptop table comprises a folding table having a rectangular upper platform with a center and an upper socket continuously disposed through the center. The folding table also comprises a vertical section having a first end spaced apart from a second end. A continuous substantially columnar ball is disposed on each of the first end and the second end. The substantially columnar ball of the first end is rotatably and removably disposed within the upper socket.

A first lower platform is provided and comprises a squared end spaced apart from a thin edge, with a first lower length there between. The table is also provided with squared and even rounded end in replacement of the thin edge. A continuous lower socket is disposed within the first lower platform, adjacent the squared end. The substantially columnar ball of the second end is rotatably and removably disposed within the lower socket. A second lower platform is provided, with a squared end spaced apart from a thin edge, a second lower length there between being less than the first lower length. The squared end of the first lower platform selectively abuts the squared end of the second lower platform. Each squared end comprises a magnet for firm abutment. The squared ends are connected by a 180 degree hinge.

A pair of 90 degree hinges is provided. One of each 90 degree hinge connects the first end to the upper platform. One of each 90 degree hinge connects the second end to the first lower platform. A limit support is disposed at each of the first end and second end. One limit support braces the first end to the upper platform. One limit support braces the second end to the first lower platform.

The folding table is selectively collapsed into a first position wherein the upper platform, the vertical section, and the first lower platform and second lower platform are in immediate adjacent and parallel position. The 90 degree hinges and limit supports selectively support the folding table in an expanded second position. A user selectively sits with thighs atop the first lower platform and the second lower platform. The folding table is therein supported, with the upper platform available for positioning an existing laptop or other existing tool or item above the user's thighs.

The compactness of the collapsible computer laptop table in the first position is highly significant. The taper from the squared ends to the thin edges of the lower platforms offers the greatest comfort for the user while easily securing the expanded, second position for table use. Any of a choice of lightweight, heavyweight, and custom materials are chosen for platform and center section makeup.

Thus has been broadly outlined the more important features of the present collapsible computer laptop table so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
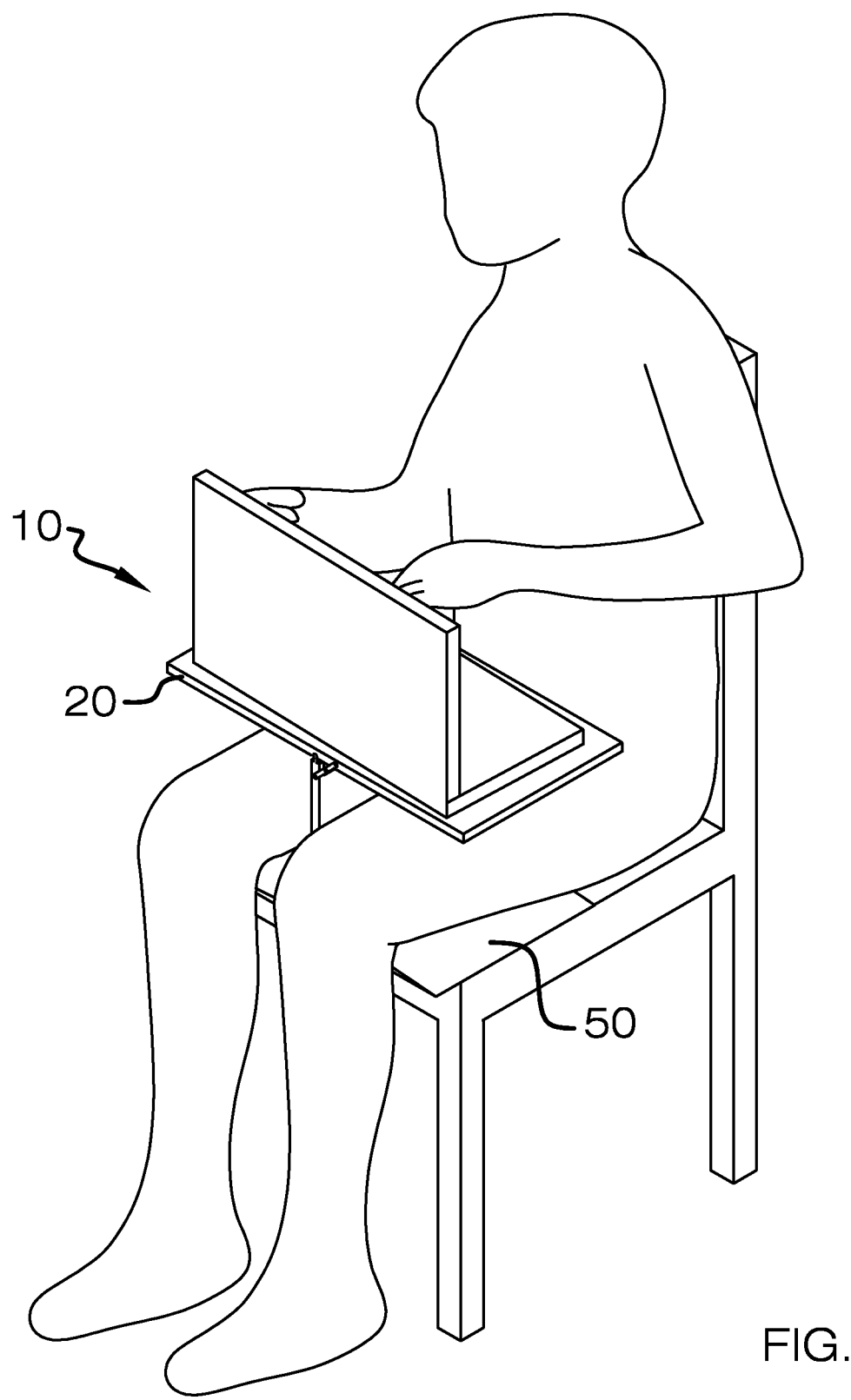
FIG. 1 is an in use view.
Figure 2:
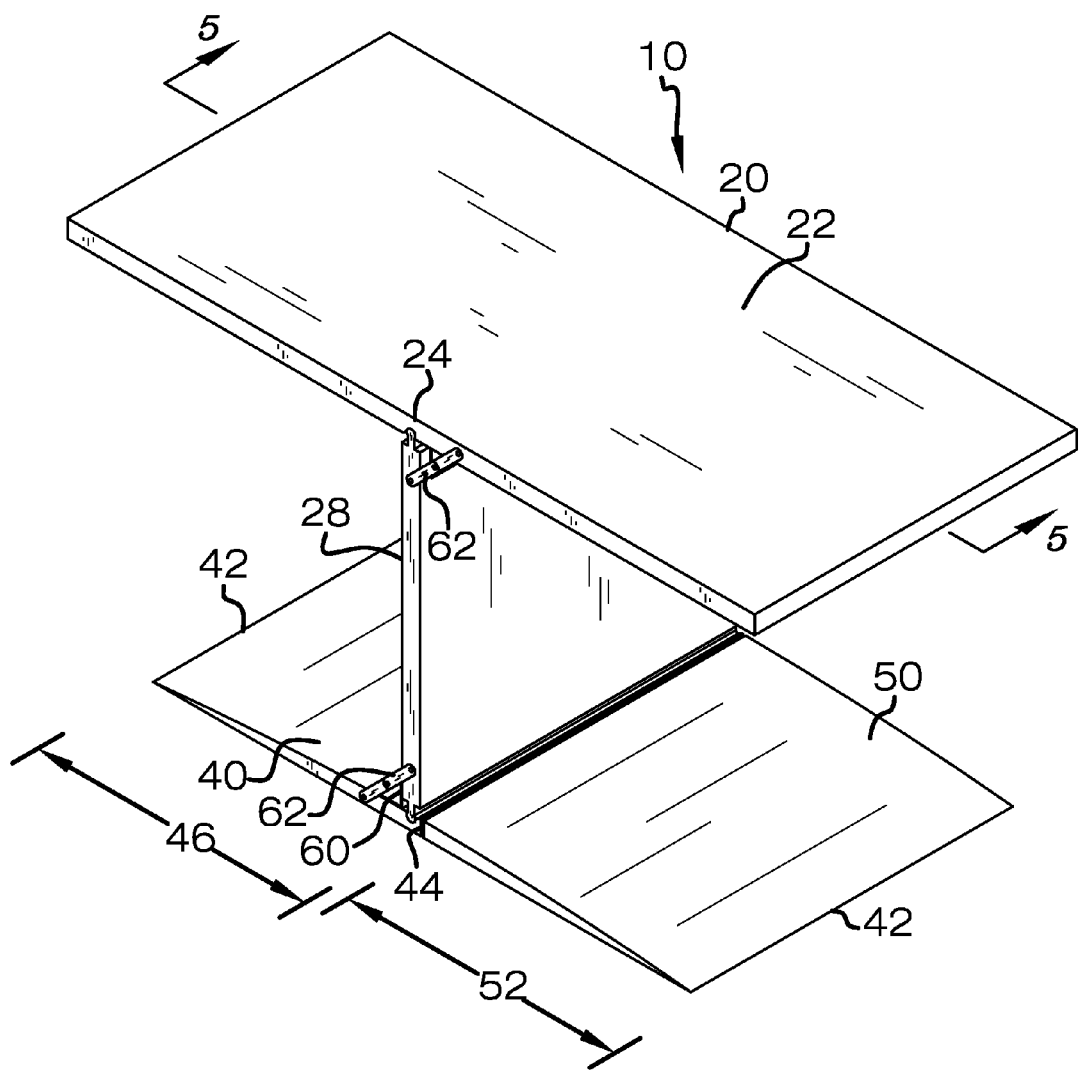
FIG. 2 is a perspective view.
Figure 3:
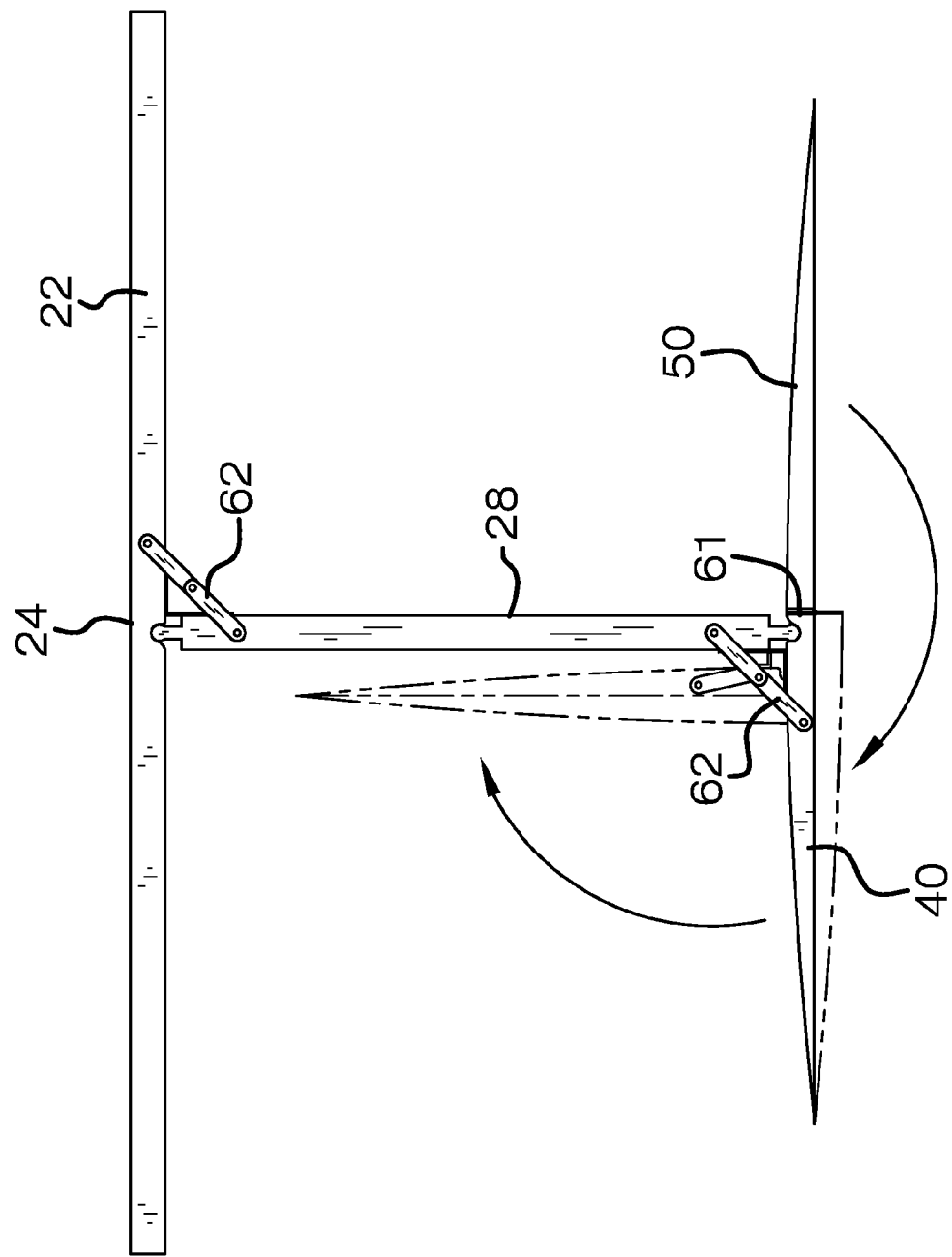
FIG. 3 is a front view.
Figure 4:
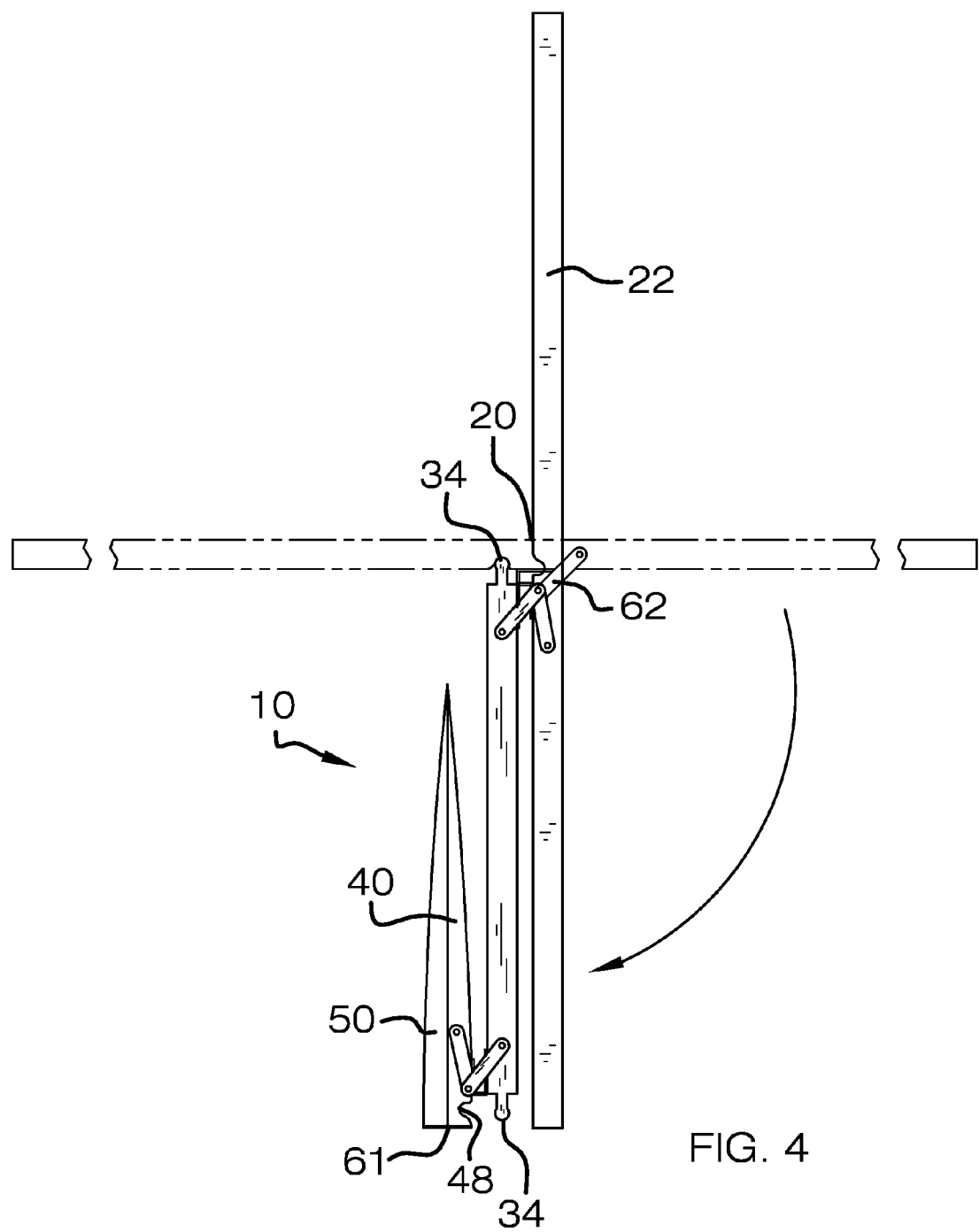
FIG. 4 is a front collapsed view.
Figure 5:
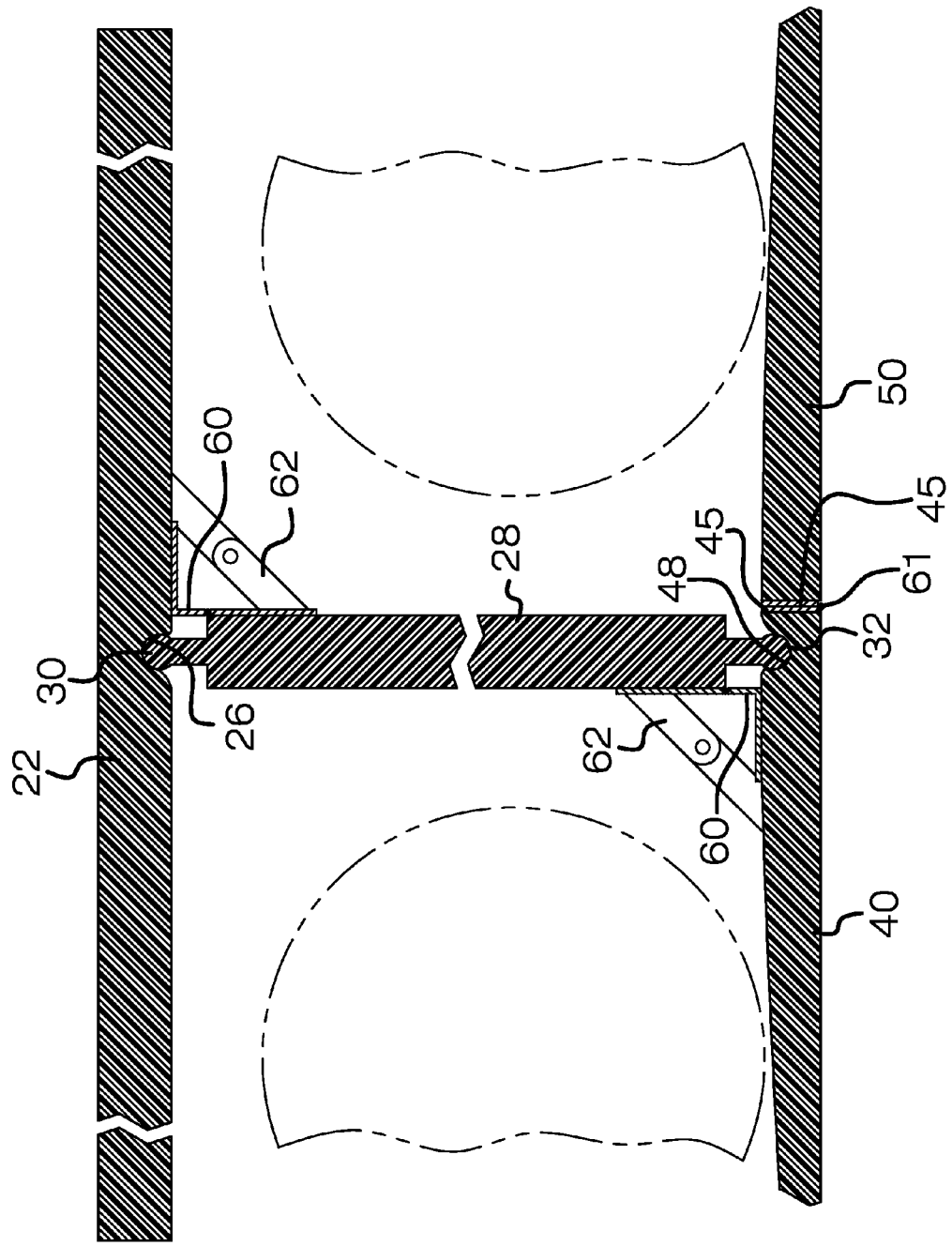
FIG. 5 is a cross sectional view of FIG. 2, taken along the line 5-5.

With reference now to the drawings, and in particular FIGS. 1 through 5 thereof, an example of the collapsible computer laptop table employing the principles and concepts of the present collapsible computer laptop table and generally designated by the reference number 10 will be described.

Referring to FIGS. 1 through 5, the collapsible computer laptop table 10 is illustrated. The collapsible computer laptop table 10 comprises a folding table 20 having a rectangular upper platform 22 with a center 24 and an upper socket 26 continuously disposed through the center 24. The folding table 20 also comprises a vertical section 28 having a first end 30 spaced apart from a second end 32. A continuous substantially columnar ball 34 is disposed on each of the first end 30 and the second end 32. The substantially columnar ball 34 of the first end 30 is rotatably and removably disposed within the upper socket 26.

A first lower platform 40 is provided and comprises a squared end 44 spaced apart from a thin edge 42, with a first lower length 46 there between. A continuous lower socket 48 is disposed within the first lower platform 40, adjacent the squared end 44. The substantially columnar ball 34 of the second end 32 is rotatably and removably disposed within the lower socket 48. A second lower platform 50 is provided, with a squared end 44 spaced apart from a thin edge 42, a second lower length 52 there between being less than the first lower length 46. The squared end 44 of the first lower platform 40 selectively abuts the squared end 44 of the second lower platform 50. Each squared end 44 comprises a magnet 45 for firm abutment. A 180 degree hinge 61 joins the squared ends 44 to provide selective folded abutment of the first lower platform 40 to the second lower platform 50.

A pair of 90 degree hinges 60 is provided. One of each 90 degree hinge 60 connects the first end 30 to the upper platform 22. One of each 90 degree hinge 60 connects the second end 32 to the first lower platform 40. A limit support 62 is disposed proximal each of the first end 30 and second end 32. One limit support 62 braces the first end 30 to the upper platform 22. One limit support 62 braces the second end 32 to the first lower platform 40.

The folding table 20 is selectively collapsed into a first position wherein the upper platform 22, the vertical section 28, and the first lower platform 40 and second lower platform 50 are in immediate adjacent and parallel position. The 90 degree hinges 60 and limit supports 62 selectively support the folding table 20 in an expanded second position. A user selectively sits with thighs atop the first lower platform 40 and the second lower platform 50. The folding table 20 is therein supported, with the upper platform 22 available for positioning an existing laptop or other existing tool or project above the user's thighs.

What is claimed is:

1. A collapsible computer laptop table comprising:
    a folding table comprising a rectangular upper platform having a center, an upper socket continuously disposed through the center;
    a vertical section having a first end spaced apart from a second end;
    a continuous substantially columnar ball disposed on each end, the substantially columnar ball of the first end rotatably and removably disposed within the upper socket;
    a first lower platform having a squared end spaced apart from a thin edge, a first lower length there between;
    a continuous lower socket disposed within the first lower platform adjacent the squared end, the substantially columnar ball of the second end rotatably and removably disposed within the lower socket;
    a second lower platform having a squared end spaced apart from a thin edge, a second lower length there between less than the first lower length;
    a 180 degree hinge connecting the squared end of the first lower platform to the squared end of the second lower platform;
    wherein the squared end of the first lower platform selectively abuts the squared end of the second lower platform;
    a magnet disposed on each squared end; and
    a pair of 90 degree hinges, one of each 90 degree hinge connecting the first end to the upper platform, one of each 90 degree hinge connecting the second end to the first lower platform;
    wherein the folding table is selectively collapsed to a first position;
    wherein the 90 degree hinges selectively expand the folding table into a second position; and
    wherein a user selectively sits atop the first lower platform and the second lower platform with the folding table in the second position.

2. A collapsible computer laptop table comprising:
    a folding table comprising a rectangular upper platform having a center, an upper socket continuously disposed through the center;
    a vertical section having a first end spaced apart from a second end;
    a continuous substantially columnar ball disposed on each end, the substantially columnar ball of the first end rotatably and removably disposed within the upper socket;
    a first lower platform having a squared end spaced apart from a thin edge, a first lower length there between;
    a continuous socket disposed within the first lower platform adjacent the squared end, the substantially columnar ball of the second end rotatably and removably disposed within the first lower platform socket;
    a second lower platform having a squared end spaced apart from a thin edge, a second lower length there between less than the first lower length;
    a 180 degree hinge connecting the squared end of the first lower platform to the squared end of the second lower platform;
    wherein the squared end of the first lower platform selectively abuts the squared end of the second lower platform;
    a magnet disposed on each squared end;
    a pair of 90 degree hinges, one of each 90 degree hinge connecting the first end to the upper platform, one of each 90 degree hinge connecting the second end to the first lower platform; and
    a limit support disposed at each of the first end and the second end, one limit support selectively bracing the first end to the upper platform, one limit support selectively bracing the second end to the first lower platform;
    wherein the folding table is selectively collapsed to a first position;
    wherein the 90 degree hinges and limit supports selectively support the folding table in an expanded second position; and
    wherein a user selectively sits atop the first and second lower platforms.

* * * * *